United States Patent
Itoh

(10) Patent No.: US 9,979,775 B2
(45) Date of Patent: May 22, 2018

(54) IMAGE FORMATION APPARATUS, NON-TRANSITORY COMPUTER-READABLE STORAGE MEDIUM, AND METHOD FOR MANAGING USER INFORMATION STORED IN A BROWSER

(71) Applicant: Konica Minolta, Inc., Chiyoda-ku, Tokyo (JP)

(72) Inventor: Ayumi Itoh, Takarazuka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 253 days.

(21) Appl. No.: 14/881,904

(22) Filed: Oct. 13, 2015

(65) Prior Publication Data
US 2016/0112532 A1    Apr. 21, 2016

(30) Foreign Application Priority Data
Oct. 16, 2014    (JP) .................................. 2014-211623

(51) Int. Cl.
*G06F 15/167*    (2006.01)
*H04L 29/08*    (2006.01)
*H04L 29/06*    (2006.01)

(52) U.S. Cl.
CPC .............. *H04L 67/02* (2013.01); *H04L 63/08* (2013.01)

(58) Field of Classification Search
CPC ................................ H04L 63/08; H04L 67/02
See application file for complete search history.

(56) References Cited

U.S. PATENT DOCUMENTS

| | | | | |
|---|---|---|---|---|
| 8,625,122 B2* | 1/2014 | Tsujimoto | ............... | H04L 63/08 358/1.1 |
| 9,092,704 B2* | 7/2015 | Yoshida | ................. | G06K 15/02 |
| 2006/0101078 A1 | 5/2006 | Tashiro et al. | | |

(Continued)

FOREIGN PATENT DOCUMENTS

| | | |
|---|---|---|
| CN | 102209165 A | 10/2011 |
| JP | 2006-134261 A | 5/2006 |
| JP | 2008-229993 A | 10/2008 |

OTHER PUBLICATIONS

Office Action (Notice of Grounds of Rejection) dated Oct. 25, 2016, by the Japanese Patent Office in corresponding Japanese Patent Application No. 2014-211623 and English translation of the Office Action. (7 pages).

(Continued)

*Primary Examiner* — Mohamed A Wasel
(74) *Attorney, Agent, or Firm* — Buchanan Ingersoll & Rooney PC

(57) ABSTRACT

An MFP includes a processor following a user instruction to execute a browser and cause a display device to display a designated web page. In doing so, the processor obtains user information and stores it to a memory. The processor determines that the user information stored in the memory is deleted at a point of time at which the processor determines that the MFP presents a predefined state allowing the MFP to end displaying a web page or at a point of time at which the processor determines that a user operation is done that is predefined to cause the MFP to end displaying the web page. At the earlier one of these points of time, the processor deletes the user information stored in the memory.

18 Claims, 6 Drawing Sheets

(56) References Cited

U.S. PATENT DOCUMENTS

2011/0239124 A1 9/2011 Tsujimoto

OTHER PUBLICATIONS

Office Action dated Aug. 8, 2017, by the Japanese Patent Office in corresponding Japanese Patent Application No. 2014-211623 and English translation of the Office Action (6 Pages).
Chinese Office Action dated Nov. 16, 2017, corresponding to counterpart Chinese Application No. 201510661412.4 and English Translation thereof (21 pages).

* cited by examiner

IMAGE FORMATION APPARATUS, NON-TRANSITORY COMPUTER-READABLE STORAGE MEDIUM, AND METHOD FOR MANAGING USER INFORMATION STORED IN A BROWSER

This application is based on Japanese Patent Application No. 2014-211623 filed with the Japan Patent Office on Oct. 16, 2014, the entire content of which is hereby incorporated by reference.

BACKGROUND OF THE INVENTION

Field of the Invention

The present disclosure relates to an image formation apparatus, a non-transitory computer-readable storage medium having a program stored therein to control the image formation apparatus, and a method for controlling the image formation apparatus, and more specifically to an image formation apparatus connectable to the Internet via a browser, a non-transitory computer-readable storage medium having a program stored therein to control the image formation apparatus, and a method for controlling the image formation apparatus.

Description of the Related Art

Some image formation apparatuses such as multi-functional peripheral (MFP) have a browser installed therein to connect to the Internet to browse websites. The browser stores user information such as a history of browsing web pages via the browser, credentials such as an identification (ID), a password and the like input in viewing a web page, and the like. The user information is used when displaying the same web page again via the browser.

Once the MFP's browser has stored the user information therein, the user can use the user information held in the browser to view a web page. As such, when the MFP with the browser holding a first user's user information is used by a second user, the second user can use the first user's user information.

In order to prevent such leakage of user information, a timing of deleting the user information is set in the MFP. For example, Japanese Laid-Open Patent Publication No. 2011-206962 discloses a multi-function printer set to discard user information at logout by way of example. Another example of a timing of discarding user information is a timing of a timeout (or an auto-reset) without any user operation done to the image formation apparatus for a period of time.

SUMMARY OF THE INVENTION

An image formation apparatus such as an MFP may be installed in an office or the like and shared by a plurality of users. Furthermore, an image formation apparatus may be installed in a store or the like and used by unspecified users. In the former case, only a previously registered user/users is/are permitted to use the apparatus. Accordingly, the user is asked to log in. In the latter case, the user can use the apparatus without a log in operation. That is, how the image formation apparatus is reset varies depending on in what pattern it is used. As such, if a timing of deleting user information is uniformly set, the user information may not be deleted.

For example, if the image formation apparatus is used in the pattern of the former case and the timing of deleting user information is set to that of auto-reset, and a user logs out in that condition, the image formation apparatus does not perform an auto-reset process, and the user information is not deleted. Thus, if such a setting is done, the user information of the user who has logged out will be held in the browser. In that case, when a next user uses the browser, the user information of the user who has logged out is displayed. This leads to leakage of the user information.

Furthermore, if the image formation apparatus is used in the pattern of the latter case, the user uses the image formation apparatus without a log in, and the image formation apparatus does not perform a log out process at auto-reset. If the timing of deleting user information is set to that of a log out, and the image formation apparatus performs auto-reset, the user information is not deleted. As a result, the user information of the user who used the browser immediately before auto reset is performed will be held in the browser. This case also allows the user information of the user who used the browser immediately before auto reset is performed to be displayed when a next user uses the browser. This leads to leakage of the user information.

The present disclosure has been made in view of such an issue and contemplates an image formation apparatus that can appropriately manage user information stored in a browser mounted in the image formation apparatus. The present disclosure also contemplates a program used to control the image formation apparatus. The present disclosure also contemplates a method for controlling the image formation apparatus.

According to one embodiment, an image formation apparatus having a browser installed therein is provided. The present image formation apparatus comprises: a memory; and a processor coupled to the memory. The processor executes the browser and causes a display device to display a designated web page. The memory stores therein user information obtained when the processor executes the browser. The processor is configured to: determine a point of time at which the user information stored in the memory is deleted; delete at the point of time as determined the user information stored in the memory; determine that the image formation apparatus presents a predefined state allowing the image formation apparatus to end displaying the web page; determine that a predefined user operation is done to the image formation apparatus to cause the image formation apparatus to end displaying the web page; and delete the user information stored in the memory, at an earlier one of a point of time at which it is determined that the predefined state is presented and a point of time at which it is determined that the predefined user operation is performed.

Preferably the processor is configured to: determine whether a user is authenticated; and be capable of executing the browser in response to both a user operation done by an authenticated user and a user operation done by a user who does not require authentication. The processor is configured to: delete user information of at least the authenticated user at an earlier one of the point of time at which it is determined that the predefined state is presented and the point of time at which it is determined that the predefined user operation is performed; and delete the user information stored in the memory, at a previously selected one of the point of time at which it is determined that the predefined state is presented and the point of time at which it is determined that the predefined user operation is performed.

More preferably, when a first program provided for deleting the user information stored in the memory, at an earlier one of the point of time at which it is determined that the predefined state is presented and the point of time at which it is determined that the predefined user operation is performed, is installed in the image formation apparatus, the first program replaces a second program provided for deleting the user information stored in the memory, at a previously selected one of the point of time at which it is determined that the predefined state is presented and the point of time at which it is determined that the predefined user operation is performed. The first program deletes the user information stored in the memory, at an earlier one of the point of time at which it is determined that the predefined state is presented and the point of time at which it is determined that the predefined user operation is performed.

Preferably the processor deletes the user information of the authenticated user at an earlier one of the point of time at which it is determined that the predefined state is presented and the point of time at which it is determined that the predefined user operation is performed. The processor deletes user information of the user who does not require authentication at a previously selected one of the point of time at which it is determined that the predefined state is presented and the point of time at which it is determined that the predefined user operation is performed.

Preferably, the processor determines that the predefined state is presented when a timeout arrives and/or when processing a job via the browser ends, and the processor determines that the predefined user operation is performed at least when a user performs a log out operation.

Preferably, if the image formation apparatus is processing a job at a point of time at which it is determined that the user information stored in the memory is to be deleted, the processor deletes the user information after the image formation apparatus has completed processing the job.

According to another embodiment, a non-transitory computer-readable storage medium is provided that has a control program stored therein to control an image formation apparatus having a browser installed therein. The control program causes the image formation apparatus to perform: executing the browser and causing a display device to display a designated web page; obtaining user information in the executing the browser; storing the user information to a memory of the image formation apparatus; determining a timing of deleting the user information stored in the memory; and deleting the user information stored in the memory, at a point of time at which it is determined that the timing of deleting the user information has arrived. The determining that the timing of deleting the user information has arrived includes: determining that the image formation apparatus presents a predefined state allowing the image formation apparatus to end displaying the web page; and determining that a predefined user operation is done to the image formation apparatus to cause the image formation apparatus to end displaying the web page. The deleting the user information includes deleting the user information stored in the memory, at an earlier one of a point of time at which it is determined that the predefined state is presented and a point of time at which it is determined that the predefined user operation is performed.

Preferably, the control program further causes the image formation apparatus to determine whether a user is authenticated. The executing the browser includes being capable of executing the browser in response to both a user operation done by an authenticated user and a user operation done by a user who does not require authentication. The deleting the user information includes deleting user information of at least the authenticated user at an earlier one of the point of time at which it is determined that the predefined state is presented and the point of time at which it is determined that the predefined user operation is performed. The deleting the user information further includes deleting the user information stored in the memory, at a previously selected one of the point of time at which it is determined that the predefined state is presented and the point of time at which it is determined that the predefined user operation is performed.

According to still another embodiment, a method for controlling an image formation apparatus having a browser installed therein is provided. The present method comprises: executing the browser and causing a display device to display a designated web page; obtaining user information in the executing the browser; storing the user information to a memory of the image formation apparatus; determining a point of time at which the user information stored in the memory is deleted; and deleting at the point of time as determined the user information stored in the memory. The determining includes: determining that the image formation apparatus presents a predefined state allowing the image formation apparatus to end displaying the web page; and determining that a predefined user operation is done to the image formation apparatus to cause the image formation apparatus to end displaying the web page. The deleting the user information includes deleting the user information stored in the memory, at an earlier one of a point of time at which it is determined that the predefined state is presented and a point of time at which it is determined that the predefined user operation is performed.

Preferably, the present method further comprises determining whether a user is authenticated. The executing the browser includes being capable of executing the browser in response to both a user operation done by an authenticated user and a user operation done by a user who does not require authentication. The deleting the user information includes deleting user information of at least the authenticated user at an earlier one of the point of time at which it is determined that the predefined state is presented and the point of time at which it is determined that the predefined user operation is performed. The deleting the user information further includes deleting the user information stored in the memory, at a previously selected one of the point of time at which it is determined that the predefined state is presented and the point of time at which it is determined that the predefined user operation is performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiment. In the following description, identical parts and components are identically denoted. They are also identical in name and function. Accordingly, they will not be described repeatedly.

<Configuration of Apparatus>

Figure 1:
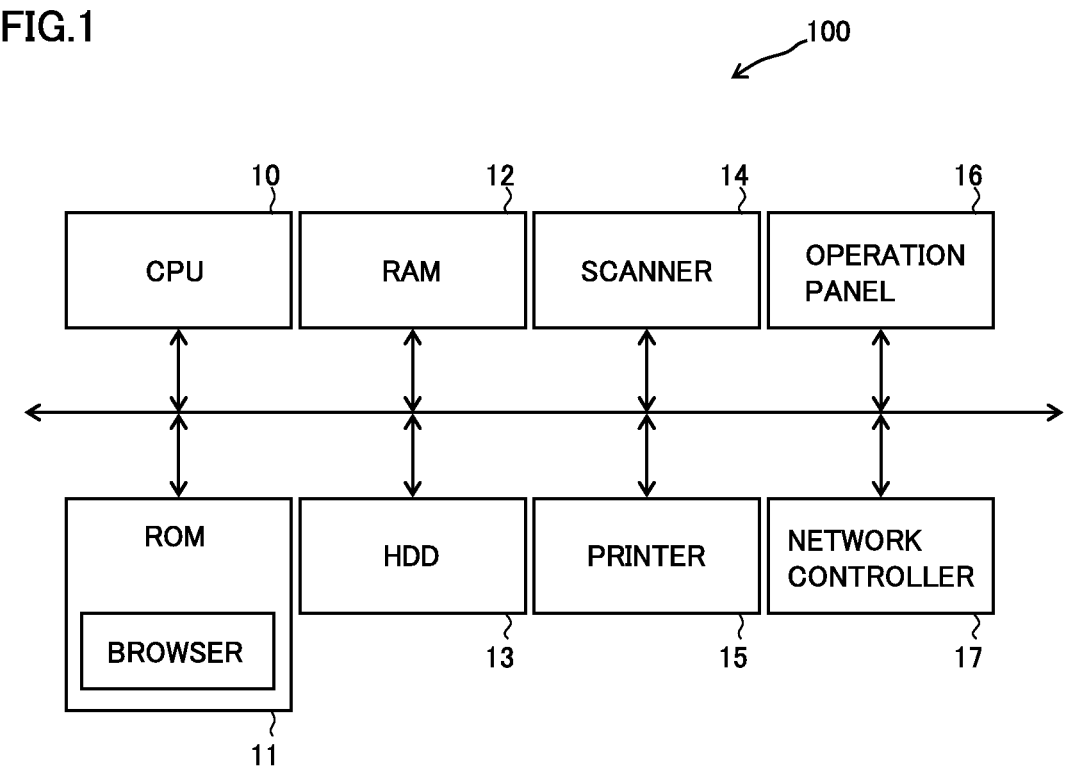
FIG. 1 shows one example in configuration of a multifunctional peripheral (MFP) as an example of an image formation apparatus according to an embodiment.

FIG. 1 shows one example in configuration of a multifunctional peripheral (MFP) as an example of an image formation apparatus according to an embodiment. With reference to FIG. 1, an MFP 100 includes a central processing unit (CPU) 10 for generally controlling the apparatus. Furthermore, MFP 100 includes a read only memory (ROM) 11 for storing a program such as a browser executed by CPU 10, a random access memory (RAM) 12 serving as a working area when CPU 10 executes the program, and a hard disk drive (HDD) 13 which is one example of a storage device for storing image data and the like. Furthermore, MFP 100 includes a scanner 14, a printer 15, an operation panel 16, and a network controller 17. Network controller 17 controls communications done via the Internet.

<Outline of Operation>

MFP 100 according to the present embodiment has a browser installed therein as one of programs. More specifically, MFP 100 has ROM 11 with the browser stored therein. When the browser is started in response to a user operation, MFP 100 accesses via the Internet a device designated by the user operation, and MFP 100 displays on operation panel 16 a web page based on data obtained from that device.

When MFP 100 displays the web page, the browser stores information of the displayed web page in RAM 12 temporarily. This information is also called a cache. When MFP 100's browser is again instructed to display the same web page, then, before again accessing the device and obtaining data therefrom, the browser refers to the information stored in RAM 12. Then, MFP 100's browser uses the information stored in RAM 12 to display the designated web page. The cache stored in RAM 12 allows MFP 100's browser to fast display the web page second time et seq.

Furthermore, when MFP 100's browser displays the web page, the browser receives data so-called a cookie from the device providing the page and stores it to HDD 13. The cookie includes data designated by the device providing the page. For example, the cookie includes information of the user, such as an ID and a password, a date and time of displaying the web page, and the like. When MFP 100's browser is again instructed to display the same web page, the browser passes to the device the cookie stored in HDD 13. The MFP 100's browser communicating the cookie with the device providing the page can display the web page second time et seq. without requiring user information again input and the like.

Furthermore, when MFP 100's browser is displaying a web page, and the user performs an operation to input credentials such as an ID and a password to the browser, the browser receives and stores the credentials to HDD 13. When MFP 100's browser is again instructed to display the same web page, the browser passes the credentials that are stored in HDD 13 to the device providing the page and causes the device to perform an authentication process. MFP 100's browser can thus dispense with information input on the web page for authentication second time et seq. and thus fast display information after authentication.

When MFP 100 operates in response to a user's operation to operate the browser to display a web page, MFP 100 stores information, such as a cache as described above, of that user to HDD 13 (hereinafter the information such as a cache will also be referred to as user information).

The MFP is disposed for example in an office, a store or the like. In that case, the MFP is used by multiple users or a large number of unspecified users. MFP 100 according to the present embodiment is placed in an environment allowing a large number of users to use it for the sake of illustration.

When a first user finished using MFP 100 and thereafter the first user's user information is held in MFP 100 at HDD 13 or the like, and in that condition a second user uses MFP 100 and operates the browser, the first user's user information will be used. For example, when the second user causes MFP 100's browser to display a web page, the web page will automatically be logged in with the first user's credentials used, and thus displayed.

Accordingly, MFP 100 according to the present embodiment previously receives from the user a setting of whether user information should be deleted. And MFP 100 follows the setting to process the user information stored in HDD 13 or the like. In other words, when MFP 100 has a setting done therein to delete user information, MFP 100 deletes the user information of the user of interest from HDD 13 or the like at a point of time at which the user's operation is considered to have ended.

More specifically, MFP 100 determines at a point of time that MFP 100 presents a predefined state allowing the browser to end displaying a web page, or at a point of time that MFP 100 is operated by a user, as predefined, to cause the browser to end displaying a web page. And at the earlier one of the two points of time, MFP 100 deletes user information stored in HDD 13 or the like.

Note that in the following description, the predefined state allowing the browser to end displaying a web page is exemplified by a state in which MFP 100 performs a timeout process. Furthermore, the user operation predefined to cause the browser to end displaying a web page is exemplified by a log out operation.

The predefined state allowing the browser to end displaying a web page and the user operation predefined to cause the browser to end displaying a web page are not limited to the above examples. The predefined state allowing the browser to end displaying a web page is also exemplified by a state in which MFP 100 provides poor communications and is disconnected from the device providing the web page. Furthermore, the predefined state is also exemplified by a state in which MFP 100 presents a hardware error or the like and accordingly, the browser is inoperable. Furthermore, the user operation predefined to cause the browser to end displaying a web page is exemplified by a user operation performed to close the browser's displaying from operation panel 16. Furthermore, the predefined user operation is also exemplified by an operation done for another operation, such as a setting of copying, done while the browser is executed.

Preferably, if the browser is processing a job at the earlier one of the two points of time at which it is determined that user information is to be deleted, then, MFP 100 deletes the user information after the browser has completed processing the job. The browser's job processing corresponds for example to a process for printing a web page, a process for downloading document data from a web page and storing the data to HDD 13, and the like.

Figure 2:
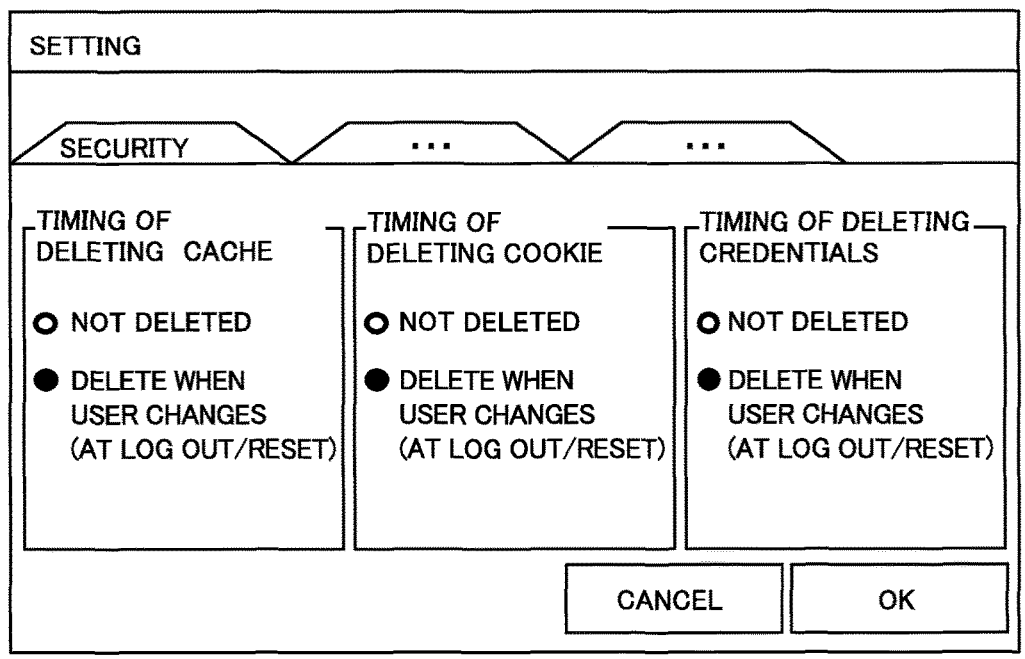
FIG. 2 shows one example of a screen presented for setting whether user information should be deleted.

FIG. 2 shows one example of a screen presented for setting whether user information should be deleted. With reference to FIG. 2, as one example, MFP 100 receives a setting of whether user information should be deleted from HDD 13 or the like for each piece of the user information (e.g., a cache, a cookie, and credentials). MFP 100 may receive the setting for each user. In that case, for a logged in user, MFP 100 processes the user's user information in accordance with the above setting for that user. For a non logged in user (a so called visitor user), MFP 100 processes the user's user information in accordance with a uniform setting.

Figure 3:
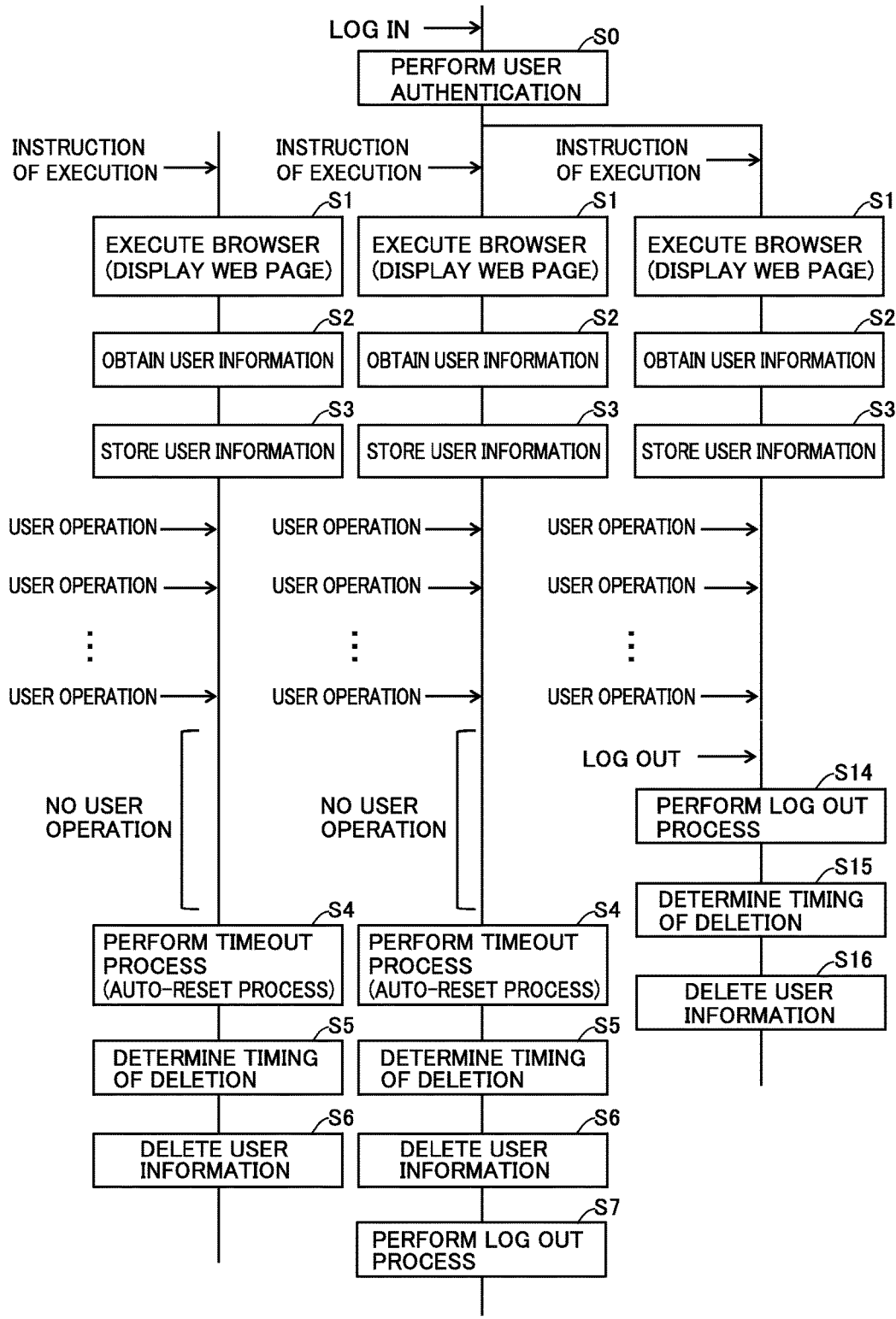
FIG. 3 shows one example of a flow of how the MFP operates.

FIG. 3 shows one example of a flow of how MFP 100 operates. FIG. 3 at a left side represents a flow of an operation in MFP 100 presented when it is operated by a non logged in user (a so called visitor user). FIG. 3 at a center and a right side represents a flow of an operation in MFP 100 presented when it is operated by a logged in user. In FIG. 3, steps S1-S3 are operations common among the users.

With reference to FIG. 3, for the logged in user, MFP 100 receives a log in operation from the user and performs user authentication (step S0). When it is determined that the user authentication has successfully been done, and an instruction is received from the user to execute the browser, or when an instruction is received from a non logged in user to execute the browser, MFP 100 executes the browser to display a designated web page (Step S1).

When MFP 100 displays the web page MFP 100 obtains the displayed web page's information, an input user ID and other user identification (step S2) and stores the user information to HDD 13 or the like (step S3).

MFP 100 follows a user operation to continue to execute the browser, and continue to display the web page and store the user information.

Once the non logged in user has finished using MFP 100, the user departs therefrom without performing any particular operation to end using the MFP. When no user operation is performed for a previously set period of time, MFP 100 determines that the user has finished using it and MFP 100 performs a timeout process (Step S4). In the timeout process, MFP 100 is automatically initialized, when MFP 100 determines that a timing of deleting the user's user information from HDD 13 or the like has arrived (step S5), and MFP 100 deletes the user information (step S6). Note that if the browser is processing a job at a point of time at which it is determined that the timeout process is to be performed, preferably, MFP 100 deletes the user information after the browser has completed processing the job.

When the logged in user does not perform any operation for a previously set period of time, MFP 100 likewise determines that the user has finished using it and MFP 100 performs the timeout process (Step S4), when MFP 100 determines that a timing of deleting the user's user information from HDD 13 or the like has arrived (step S5), and MFP 100 deletes the user information (step S6). Note that if the browser is processing a job at a point of time at which it is determined that the timeout process is to be performed, preferably, MFP 100 deletes the user information after the browser has completed processing the job.

Note that for the logged in user, MFP 100 after the timeout process performs a log out process to clear the logged in user's logged in state (step S7).

When the logged in user finishes using MFP 100, the user may perform a log out operation to end using the MFP. MFP 100 follows the operation to perform the log out process (step S14), when MFP 100 determines that a timing of deleting the user's user information from HDD 13 or the like has arrived (step S15), and MFP 100 deletes the user information (step S16). Note that if the browser is processing a job at a point of time at which the log out operation is performed, preferably, MFP 100 deletes the user information after the browser has completed processing the job.

<Functional Configuration>

Figure 4:
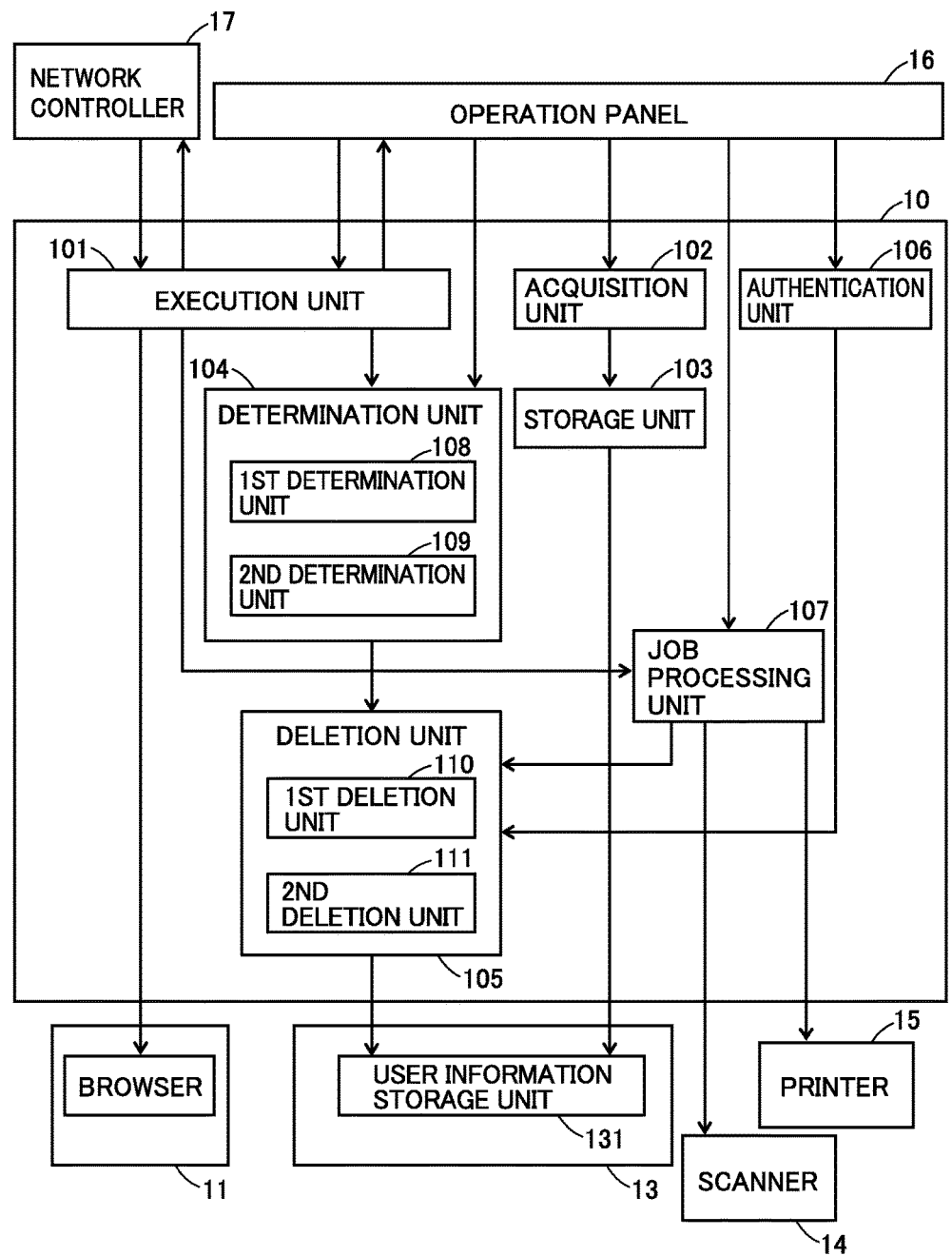
FIG. 4 is a block diagram representing one example of a functional configuration of the MFP.

FIG. 4 is a block diagram representing one example of a functional configuration of MFP 100 for performing the above operation. FIG. 4 represents functions, which are implemented mainly by the MFP 100 CPU 10 reading a program that is stored in ROM 11 to RAM 12, and executing the program. However, some function(s) may be implemented by another configuration represented in FIG. 1, or an electrical circuit or similar hardware (not shown).

With reference to FIG. 4, as one example, the MFP 100 HDD 13 includes a user information storage unit 131 serving as a storage area to store user information obtained while the browser is executed to display a web page.

Furthermore, with reference to FIG. 4, the MFP 100 CPU 10 includes an execution unit 101 operative in response to a user operation input via operation panel 16 to execute a program stored in ROM 11, or the browser. Execution unit 101 displays a designated web page on operation panel 16.

Furthermore, CPU 10 includes an acquisition unit 102 for acquiring user information. When execution unit 101 executes the browser and displays a web page, acquisition unit 102 acquires information of the web page, the user's ID input through a user operation, and the like as user information.

Furthermore, CPU 10 includes a storage unit 103 for storing the user information that acquisition unit 102 has acquired to HDD 13 at user information storage unit 131, a determination unit 104 for determining a timing of deleting the user information stored in user information storage unit 131, and a deletion unit 105 for deleting the user information that is stored in user information storage unit 131 at a point of time as determined by determination unit 104. Furthermore, CPU 10 further includes a job processing unit 107 for processing a job in accordance with a user operation received from operation panel 16.

Determination unit 104 includes a first determination unit 108 and a second determination unit 109. First determination unit 108 determines that MFP 100 presents a predefined state allowing execution unit 101 to end displaying a web page. The predefined state allowing execution unit 101 to end displaying the web page is exemplified by a state in which MFP 100 performs the timeout process.

Second determination unit 109 determines that MFP 100 is operated by a user, as predefined, to cause execution unit 101 to end displaying a web page. The user operation predefined to cause execution unit 101 to end displaying the web page is exemplified by the log out operation.

Deletion unit 105 includes a first deletion unit 110. First deletion unit 110 deletes user information stored in HDD 13, at the earlier one of the points of time determined by first and second determination units 108 and 109, respectively.

Preferably, if job processing unit 107 is processing a job at a point of time at which it is determined that user information stored in HDD 13 is to be deleted, deletion unit 105 deletes the user information after job processing unit 107 has completed processing the job.

<Operation Flow>

Figure 5:
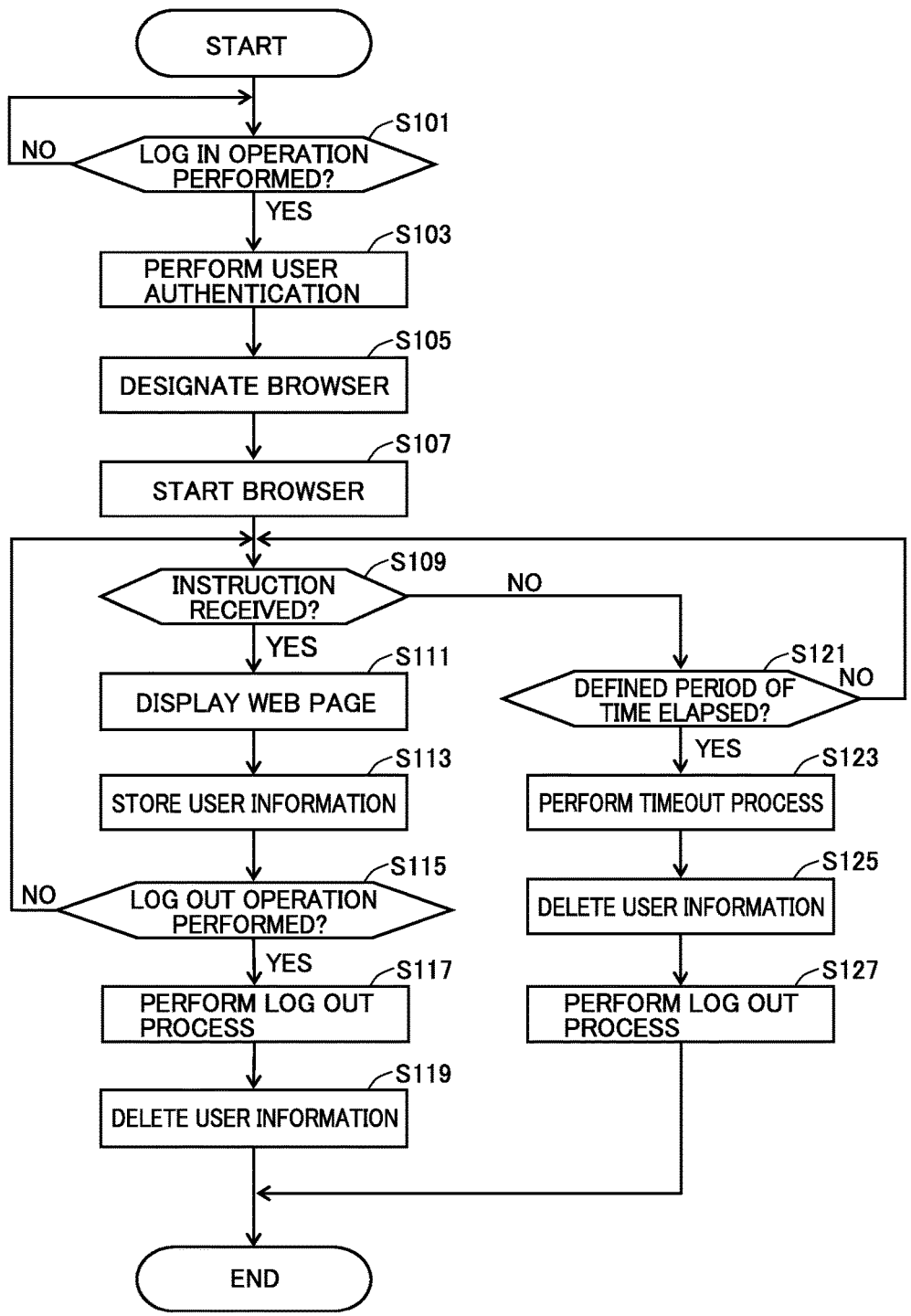
FIG. 5 is a flowchart representing one example of how the MFP operates when it receives an operation of a logged in user.
Figure 6:
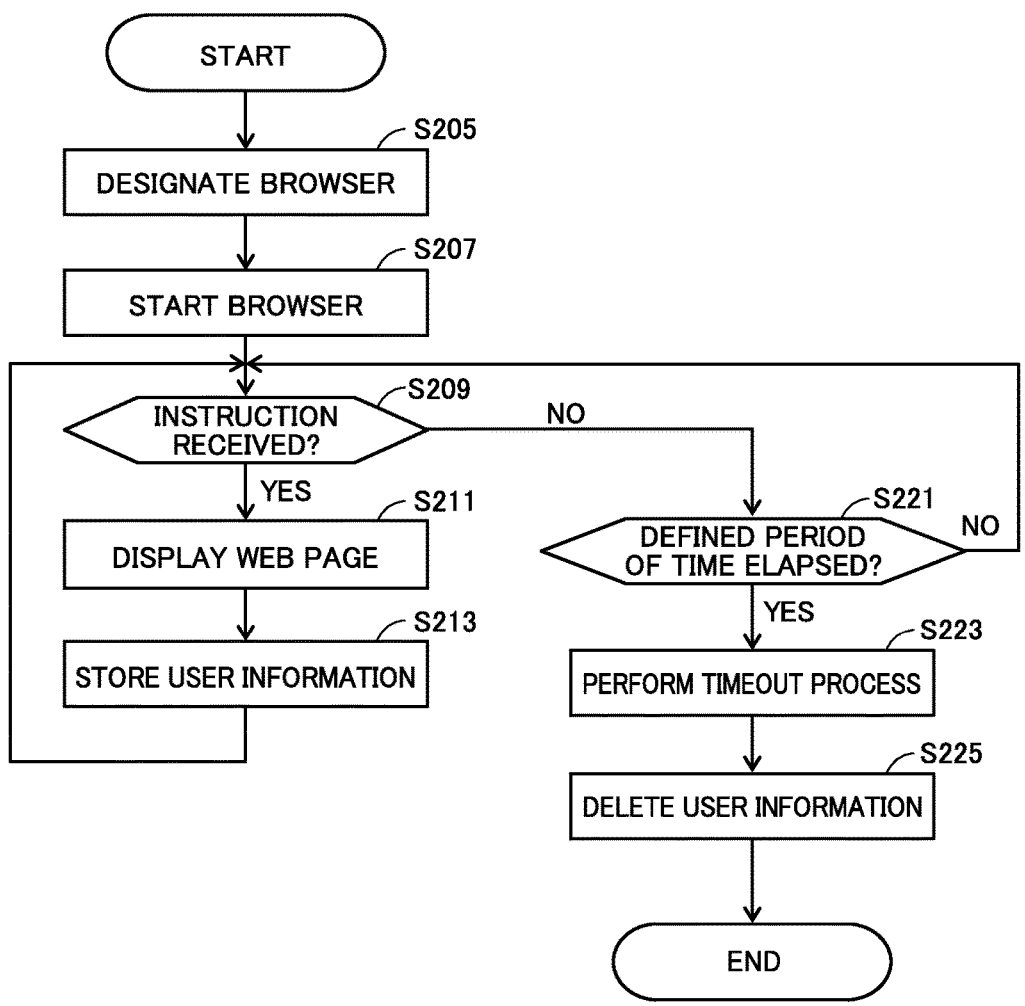
FIG. 6 is a flowchart representing one example of how the MFP operates when it receives an operation of a user who does not perform a log in operation.

FIG. 5 and FIG. 6 are flowcharts, respectively, of one example of how MFP 100 operates. FIG. 5 is a flowchart representing how MFP 100 operates when it receives an operation of a logged in user. FIG. 6 is a flowchart representing how MFP 100 operates when it receives an operation of a user who does not perform a log in operation. Either operation is implemented by the MFP 100 CPU 10 reading a program that is stored in ROM 11 to RAM 12, and executing the program to exhibit each function represented in FIG. 4.

With reference to FIG. 5, when the MFP 100 CPU 10 receives a log in operation from a user (YES in step S101), CPU 10 performs user authentication (step S103). When CPU 10 determines that the authentication has successfully been done, CPU 10 receives an indication based on a user operation to execute the browser (step S105). CPU 10 then starts the browser (step S107). If CPU 10 has already started the browser and caused the browser to operate in a background, CPU 10 renders the browser active. CPU 10 then displays a screen of the browser on operation panel 16.

When CPU 10 receives a user operation directed to the browser (YES in step S109), CPU 10 performs a process for displaying a designated web page (step S111). In doing so, CPU 10 obtains and stores information of the displayed web page, an ID input by the user, and other user information to HDD 13 (step S113).

Until the user performs a log out operation (NO in step S115), CPU 10 displays the web page and repeats an operation of storing the user information to HDD 13. Once CPU 10 has received the log out operation (YES in step S115), CPU 10 performs the log out process (step S117), when CPU 10 determines that a timing of deleting the user information stored in HDD 13 has arrived, and CPU 10 deletes the user information (step S119). Note that if a job is being processed at the point of time at which the log out operation is received, preferably CPU 10 waits in step S119 until the processing of the job is completed. After the processing of the job is completed, CPU 10 deletes the user information.

If the log out operation is preceded by a predefined period of time without any user operation performed (NO in step S109 and YES in step S121) CPU 10 performs the timeout process (step S123), when CPU 10 determines that a timing of deleting the user information stored in HDD 13 has arrived, and CPU 10 deletes the user information (step S125). Note that if the browser is processing a job at the point of time at which it is determined that the timeout process is to be performed, preferably CPU 10 waits in step S125 until the browser completes processing the job. After the browser has completed processing the job, CPU 10 deletes the user information.

Note that for the logged in user, CPU 10 after the timeout process performs the log out process to clear the logged in user's logged in state (step S127).

With reference to FIG. 6, for a non logged in user, CPU 10 receives an indication based on a user operation to execute the browser (step S205). CPU 10 then starts the browser (step S207).

When CPU 10 receives a user operation directed to the browser (YES in step S209), CPU 10 performs a process for displaying a designated web page (step S211). In doing so, CPU 10 obtains and stores information of the displayed web page, an ID input by the user, and other user information to HDD 13 (step S213).

If no user operation is performed for a predefined period of time (NO in step S209 and YES in step S221) CPU 10 performs the timeout process (step S223), when CPU 10 determines that a timing of deleing the user information stored in HDD 13 has arrived, and CPU 10 deletes the user information (step S225). Note that if the browser is processing a job at a point of time at which it is determined that the timeout process is to be performed, preferably CPU 10 waits in step S225 until the browser completes processing the job, and thereafter CPU 10 deletes the user information.

<Effect of Embodiment>

MFP 100 thus performing the above operation according to the present embodiment allows user information that is obtained while a browser of MFP 100 displays a web page and stored to HDD 13 to be deleted from HDD 13 at a point of time at which the browser ends displaying the web page. MFP 100 according to the present embodiment can thus prevent user information of a first user of the browser from being displayed or used after the first user has finished using MFP 100 when a subsequent, second user uses the browser. MFP 100 according to the present embodiment can thus prevent leakage of user information and manage the user information appropriately.

<Exemplary Variation>

A program can also be provided for causing the MFP 100 CPU 10 to perform the above operation. The program can also be stored in a flexible disk, a compact disk-read only memory (CD-ROM), a ROM, a RAM, a memory card and other computer readable storage media accompanying a computer, and provided as a program product. Alternatively, the program can be stored in a computer-incorporated hard disc or similar storage media and thus provided. Furthermore, the program can be downloaded via a network and thus provided.

The program allows an existing MFP to perform the above operation.

An existing MFP may already be equipped with a function for deleting user information. In that case, by way of example, when the existing MFP is provided with a program for causing an operation of MFP 100, the program may overwrite a program installed in the existing MFP for implementing the above function. The overwritten program allows the existing MFP to function as MFP 100 of the present embodiment.

As another example, the program may coexist in an existing MFP with a program installed in that MFP. In that case, when the existing MFP deletes user information, the MFP may use the already and additionally installed programs for different occasions, respectively, as appropriate.

As one example, the program already installed in the existing MFP allows user information to be deleted in such a manner that a timing of deleting user information is previously designated and applied to delete user information. An exemplary operation in that case will hereinafter be described as an exemplary variation.

The exemplary variation provides an MFP with hardware identical to that of MFP 100 according to the above embodiment. Accordingly, the hardware will not be described repeatedly. Hereinafter, the exemplary variation will be described with reference to MFP 100.

MFP 100 according to the exemplary variation operates for a logged in user to delete his/her user information in a method following the additionally installed program. Furthermore, MFP 100 according to the exemplary variation operates for a non logged in user to delete his/her user information in a method following the already installed program.

FIG. 4 also represents a functional configuration of MFP 100 according to the exemplary variation together. More specifically, MFP 100 according to the exemplary variation includes CPU 10 with deletion unit 105 further including a second deletion unit 111. Second deletion unit 111 deletes user information in a method following the program already installed in MFP 100 according to the exemplary variation.

In MFP 100 according to the exemplary variation deletion unit 105 operates for a logged in user to delete his/her user information via first deletion unit 110. Second deletion unit 111 deletes a non logged in user's user information.

More specifically, first determination unit 108 determines at a point of time that the predefined state allowing the browser to end displaying a web page is presented. Furthermore, second determination unit 109 determines at a point of time that MFP 100 is operated by a user, as predefined, to cause the browser to end displaying a web page. At the earlier one of the two points of time, first deletion unit 110 deletes user information stored in HDD 13.

At a preset one of the two points of time, second deletion unit 111 deletes user information stored in HDD 13.

MFP 100 thus performing the above operation according to the exemplary variation allows at least a logged in user's user information stored to HDD 13 to be deleted from HDD 13 at a point of time at which the browser ends displaying a web page. MFP 100 according to the exemplary variation can thus prevent the logged in user's user information from being displayed or used after the logged in user has finished using MFP 100 when a subsequent user uses the browser. MFP 100 according to the exemplary variation can thus prevent leakage of user information of at least a logged in user and manage the user information appropriately.

Note that the program according to the present invention may invoke a necessary one of program modules that are provided as a part of an operating system (OS) of a computer, in a prescribed arrangement, as timed as prescribed, and may cause the invoked module to perform a process. In that case, the program per se does not include the above modules and cooperates with the OS to perform the process. Such a program that does not include the modules can also be included in the program according to the present invention.

Furthermore, the program according to the present invention may be incorporated in and provided as a portion of another program. This case also presents the present program per se without including the module(s) included in the other program and the former cooperates with the latter to perform a process. Such a program incorporated in another program can also be included in the program according to the present invention.

Furthermore, while in the above description MFP 100 performs user authentication, another device connected to MFP 100 may perform user authentication and MFP 100 may obtain a resultant authentication.

The program product provided is installed in a program storing unit, such as a hard disk, and executed. Note that the program product includes a program per se and a non-transitory computer-readable storage medium having the program stored therein.

One aspect of this disclosure allows appropriate management of user information stored in a browser mounted in an image formation apparatus.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus having a browser installed therein, comprising:
   a memory; and
   a processor coupled to said memory, said processor executing said browser and causing a display device to display a designated web page, said memory storing therein user information obtained when said processor executes said browser, said processor being configured to:
   determine a point of time at which said user information stored in said memory is to be deleted;
   delete at said point of time as determined said user information stored in said memory;
   determine that the image formation apparatus presents a predefined state automatically allowing, without a user instruction to do so, the image formation apparatus to end displaying said web page; and
   determine that a predefined user operation is performed to the image formation apparatus to cause the image formation apparatus to end displaying said web page,
   wherein said processor deletes said user information stored in said memory of the image formation apparatus, at an earlier one of a point of time at which it is determined that said predefined state is presented and (ii) a point of time at which it is determined that said predefined user operation is performed.

2. The image formation apparatus according to claim 1, wherein said processor is further configured to:
   determine whether a user is authenticated;
   execute said browser in response to both a user operation done by an authenticated user and a user operation done by a user who does not require authentication;
   delete user information of at least said authenticated user at an earlier one of said point of time at which it is determined that said predefined state is presented and said point of time at which it is determined that said predefined user operation is performed; and
   delete said user information stored in said memory, at a previously selected one of said point of time at which it is determined that said predefined state is presented and said point of time at which it is determined that said predefined user operation is performed.

3. The image formation apparatus according to claim 2, wherein when a first program provided for deleting said user information stored in said memory, at an earlier one of said point of time at which it is determined that said predefined state is presented and said point of time at which it is determined that said predefined user operation is performed, is installed in the image formation apparatus, said first program replaces a second program provided for deleting said user information stored in said memory, at a previously selected one of said point of time at which it is determined that said predefined state is presented and said point of time at which it is determined that said predefined user operation is performed, and said first program deletes said user information stored in said memory, at an earlier one of said point of time at which it is determined that said predefined state is presented and said point of time at which it is determined that said predefined user operation is performed.

4. The image formation apparatus according to claim 2, wherein:
   said processor deletes said user information of said authenticated user at an earlier one of said point of time at which it is determined that said predefined state is presented and said point of time at which it is determined that said predefined user operation is performed; and
   said processor deletes user information of said user who does not require authentication at a previously selected one of said point of time at which it is determined that said predefined state is presented and said point of time at which it is determined that said predefined user operation is performed.

5. The image formation apparatus according to claim 1, wherein:
   said processor determines that said predefined state is presented when a timeout arrives and/or when processing a job via said browser ends; and
   said processor determines that said predefined user operation is performed at least when a user performs a log out operation.

6. The image formation apparatus according to claim 1, wherein if the image formation apparatus is processing a job at a point of time at which it is determined that said user information stored in said memory is to be deleted, said processor deletes said user information after the image formation apparatus has completed processing said job.

7. A non-transitory computer-readable storage medium having a control program stored therein to control an operation of an image formation apparatus having a browser installed therein, said control program causing said image formation apparatus to perform:
   executing said browser and causing a display device to display a designated web page;
   obtaining user information in said executing said browser;
   storing said user information to a memory of said image formation apparatus;
   determining a timing of deleting said user information stored in said memory; and
   deleting said user information stored in said memory, at a point of time at which it is determined that said timing of deleting said user information has arrived,
   said determining that said timing of deleting said user information has arrived including:
      determining that said image formation apparatus presents a predefined state automatically allowing, without a user instruction to do so, said image formation apparatus to end displaying said web page; and
      determining that a predefined user operation is performed to said image formation apparatus to cause said image formation apparatus to end displaying said web page,
   wherein said deleting of said user information includes deleting said user information stored in said memory of said image formation apparatus, at an earlier one of (i) a point of time at which it is determined that said predefined state is presented and (ii) a point of time at which it is determined that said predefined user operation is performed.

8. The non-transitory computer-readable storage medium according to claim 7, wherein:
   said control program further causes said image formation apparatus to determine whether a user is authenticated;
   said executing said browser includes executing said browser in response to both a user operation done by an authenticated user and a user operation done by a user who does not require authentication;
   said deleting said user information includes deleting user information of at least said authenticated user at an earlier one of said point of time at which it is determined that said predefined state is presented and said point of time at which it is determined that said predefined user operation is performed; and
   said deleting said user information further includes deleting said user information stored in said memory, at a previously selected one of said point of time at which it is determined that said predefined state is presented and said point of time at which it is determined that said predefined user operation is performed.

9. The non-transitory computer-readable storage medium according to claim 8, wherein:
   when a first program provided for deleting said user information stored in said memory, at an earlier one of said point of time at which it is determined that said predefined state is presented and said point of time at which it is determined that said predefined user operation is performed, is installed in said image formation apparatus, said first program replaces a second program provided for deleting said user information stored in said memory, at a previously selected one of said point of time at which it is determined that said predefined state is presented and said point of time at which it is determined that said predefined user operation is performed; and
   said first program's deleting said user information includes deleting said user information stored in said memory, at an earlier one of said point of time at which it is determined that said predefined state is presented and said point of time at which it is determined that said predefined user operation is performed.

10. The non-transitory computer-readable storage medium according to claim 8, wherein:
    said deleting includes deleting said user information of said authenticated user at an earlier one of said point of time at which it is determined that said predefined state is presented and said point of time at which it is determined that said predefined user operation is performed; and
    said deleting includes deleting user information of said user who does not require authentication at a previously selected one of said point of time at which it is determined that said predefined state is presented and said point of time at which it is determined that said predefined user operation is performed.

11. The non-transitory computer-readable storage medium according to claim 7, wherein:
    said determining that said predefined state is presented includes determining so when a timeout arrives and/or when processing a job via said browser ends; and
    said determining that said predefined user operation is performed includes determining so at least when a user performs a log out operation.

12. The non-transitory computer-readable storage medium according to claim 7, wherein if said image formation apparatus is processing a job at a point of time at which it is determined that said user information stored in said memory is to be deleted, said deleting said user information includes deleting said user information after said image formation apparatus has completed processing said job.

13. A method for controlling an image formation apparatus having a browser installed therein, comprising:
    executing, by a processor of said image formation apparatus, said browser and causing a display device to display a designated web page;
    obtaining, by said processor, user information in said executing said browser;
    storing, in a memory of said image formation apparatus, said user information to a memory of said image formation apparatus;
    determining, by said processor, a point of time at which said user information stored in said memory is to be deleted; and
    deleting, by said processor, at said point of time as determined said user information stored in said memory,
    wherein said determining includes:
       determining that said image formation apparatus presents a predefined state automatically allowing, without a user instruction to do so, said image formation apparatus to end displaying said web page; and
       determining that a predefined user operation is performed to said image formation apparatus to cause said image formation apparatus to end displaying said web page, and wherein said deleting said user information includes deleting said user information stored in said memory of said image formation apparatus, at an earlier one of (i) a point of time at which it is determined that said predefined state is presented and (ii) a point of time at which it is determined that said predefined user operation is performed.

14. The method for controlling an image formation apparatus according to claim 13, further comprising determining whether a user is authenticated, wherein:
said executing said browser includes executing said browser in response to both a user operation done by an authenticated user and a user operation done by a user who does not require authentication;
said deleting said user information includes deleting user information of at least said authenticated user at an earlier one of said point of time at which it is determined that said predefined state is presented and said point of time at which it is determined that said predefined user operation is performed; and
said deleting said user information further includes deleting said user information stored in said memory, at a previously selected one of said point of time at which it is determined that said predefined state is presented and said point of time at which it is determined that said predefined user operation is performed.

15. The method for controlling an image formation apparatus according to claim 14, wherein:
when a first program provided for deleting said user information stored in said memory, at an earlier one of said point of time at which it is determined that said predefined state is presented and said point of time at which it is determined that said predefined user operation is performed, is installed in said image formation apparatus, said first program replaces a second program provided for deleting said user information stored in said memory, at a previously selected one of said point of time at which it is determined that said predefined state is presented and said point of time at which it is determined that said predefined user operation is performed; and
said first program's deleting said user information includes deleting said user information stored in said memory, at an earlier one of said point of time at which it is determined that said predefined state is presented and said point of time at which it is determined that said predefined user operation is performed.

16. The method for controlling an image formation apparatus according to claim 14, wherein:
said deleting includes deleting said user information of said authenticated user at an earlier one of said point of time at which it is determined that said predefined state is presented and said point of time at which it is determined that said predefined user operation is performed; and
said deleting includes deleting user information of said user who does not require authentication at a previously selected one of said point of time at which it is determined that said predefined state is presented and said point of time at which it is determined that said predefined user operation is performed.

17. The method for controlling an image formation apparatus according to claim 13, wherein:
said determining that said predefined state is presented includes determining so when a timeout arrives and/or when processing a job via said browser ends; and
said determining that said predefined user operation is performed includes determining so at least when a user performs a log out operation.

18. The method for controlling an image formation apparatus according to claim 13, wherein if said image formation apparatus is processing a job at a point of time at which it is determined that said user information stored in said memory is to be deleted, said deleting said user information includes deleting said user information after said image formation apparatus has completed processing said job.

* * * * *